United States Patent [19]

Franklin et al.

[11] Patent Number: 4,631,534
[45] Date of Patent: Dec. 23, 1986

[54] DISTRIBUTED PACKET SWITCHING SYSTEM

[75] Inventors: Andrew D. Franklin, Boulder, Colo.; Lloyd A. Hasley, Carrollton, Tex.; James E. Smith, Palo Alto, Calif.

[73] Assignee: AT&T Information Systems Inc., Holmdel, N.J.

[21] Appl. No.: 670,981

[22] Filed: Nov. 13, 1984

[51] Int. Cl.⁴ .............................................. H04Q 1/00
[52] U.S. Cl. ............................ 340/825.5; 340/825.51; 340/825.52; 370/85
[58] Field of Search .................... 364/200; 370/79, 85, 370/92, 93, 94; 340/825.5, 825.51, 825.06, 825.07, 825.21, 825.52; 84/1.01, 1.17

[56] References Cited

U.S. PATENT DOCUMENTS

| | | | |
|---|---|---|---|
| 4,320,502 | 3/1982 | deVeer | 370/85 |
| 4,373,183 | 2/1983 | Means et al. | 370/85 X |
| 4,451,881 | 5/1984 | Grice et al. | 370/85 X |
| 4,470,112 | 9/1984 | Dimmick | 364/200 |
| 4,488,218 | 12/1984 | Grimes | 340/825.5 X |

Primary Examiner—Ulysses Weldon
Attorney, Agent, or Firm—Donald M. Duft

[57] ABSTRACT

A distributed packet switching system in which a centralized switch is not used and, instead, each transmitting port contains the intelligence required to derive and then insert the destination port and station addresses into the header of each packet to be transmitted by the port. The port circuitry that derives the destination addresses operates under control of a central controller which, prior to the setup of each call, receives information identifying the transmitting port and calling station as well as the destination station number dialed at the calling station. The controller processes this data to derive the destination port and station addresses. The derived addresses are sent to and stored in a RAM in the transmitting port. The RAM outputs the destination port and station addresses for each packet subsequently transmitted by the port on the call.

10 Claims, 6 Drawing Figures

| FIFO REGISTERS | LAST BYTE FLAG | DATA FOR BUS 109a | |
|---|---|---|---|
| 405 | 1 | DATA 2 | LAST BYTE OUT |
| 404 | 0 | DATA 1 | . |
| 403 | 0 | DATA 0 | . |
| 402 | 0 | STATION ADDRESS | . |
| 401 | 0 | PORT ADDRESS | . |
| 400 | X | XXX | FIRST BTYE OUT |

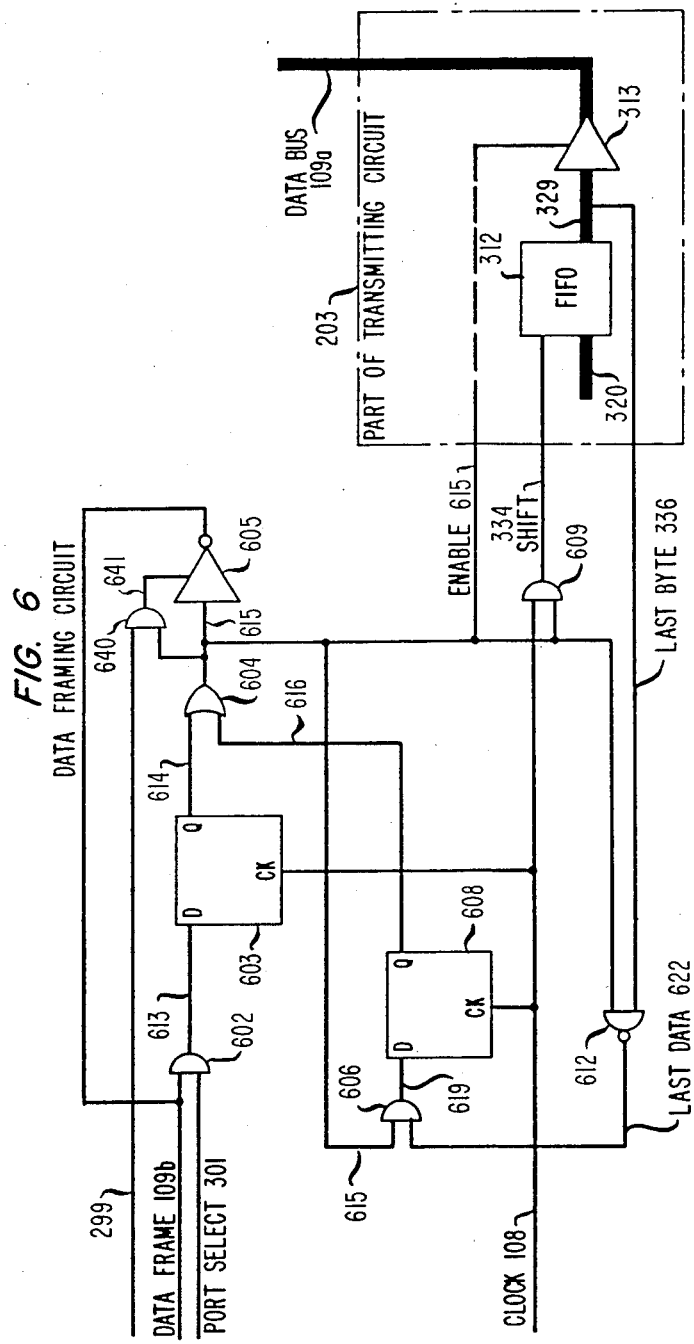

DISTRIBUTED PACKET SWITCHING SYSTEM

CROSS-REFERENCE TO RELATED APPLICATION

This application is related to the following co-pending applications: L. A. Hasley, Ser. No. 670,982, filed 11/13/84 and L. A. Hasley et al, Ser. No. 674,049, filed 11/21/84.

FIELD OF INVENTION

This invention relates to a packet switching system and in particular to a packet switching system of the distributed type.

BACKGROUND OF THE INVENTION

Packet switching systems of both the distributed and non-distributed type are known. Distributed type systems typically use a single conductor or co-axial cable that is connected to all system ports in a bus or ring configuration. A transmitting port, in these systems, communicates with a receiving port by contending for bus accesses, by winning contention, and by then transmitting its data to the receiving port. The transmitted data includes the address of the receiving port plus other header or setup information.

Although bus and ring type systems are conceptually simple, they have a number of disadvantages. For example, their reliability is not high since the entire system becomes inoperative if the single conductor bus is cut or broken. Also, a single malfunctioning port can monopolize the use of the bus by applying a continuous string of meaningless data to the bus. This can render the entire system inoperative. Further, the system throughput is not high since the single conductor bus must be used for all system functions such as arbitration, the exchange of control signals, as well as for the transmission of data between ports. Data security is also poor since the cable is long and directly extends to all user stations. This renders it susceptible to bugging by unauthorized personnel.

Non-distributed type packet switching systems, such as that shown in, U.S. Pat. No. 4,470,112 of Sept. 4, 1984 to J. O. Dimmick overcome the above mentioned disadvantages of the bus or ring type single conductor systems. The Dimmick data bus length is considerably shorter than that of the bus or ring type systems. This permits a higher bus frequency response. The ports are adjacent the data bus. The system is therefore relatively compact and can fit into a single location such as a secure equipment closet or the like. Lines extend from the ports to the associated user stations. This provides better security against bugging since the data bus itself is not accessible.

The Dimmick type system also has separate arbitration and data buses. This increases the sytem throughput by permitting bus arbitration and the data transmission to take place concurrently.

Although the Dimmick non-distributed type system is an improvement over the bus type, it still has disadvantages. For example, it requires a costly and complex central switch to convey data from a sending to a receiving port. On each packet served by the system, the transmitting port sends to the switch the data to be transmitted together with information indentifying the transmitting port and station. The switch translates the received calling station address into the address of the destination port and station. This translated information is inserted by the switch into the received packet so that the packet can be transmitted to the destination port and station.

The use of a centralized switch is costly. It is further disadvantageous in that in inhibits system flexibility and expansion. The size of the switch defines the maximum number of ports that can be served by the system. This number cannot be exceeded without replacing the existing switch with one of a higher port capacity.

Systems of the type shown by Dimmick also typically use the data bus to transmit data as well as to transmit control signals between the central controller and the ports and switch. This decreases system reliability and through-put under conditions in which a manfunctioning port is monopolizing the use of the data bus. This prevents the controller from sending commands over the data bus to deactivate the malfunctioning port.

SUMMARY OF THE INVENTION

Our invention overcomes the above discussed problems by providing a packet switching system which eliminates the need for a central switch in a system of the Dimmick type. The address translation function is distributed among the system ports. Our invention is additionally advantageous in the provision of a separate control bus interconnecting a system controller and the system ports. This bus is used to convey control information from the controller to the ports.

The address translation function is distributed by the provision of a RAM in each port. At the setup of each call, the called station number together with the calling port and station identifier (ID) is transmitted from the calling port to the controller. The controller translates the called station number into the destination port and station addresses which it sends over the control bus to the calling port. This information is written into the calling port's RAM with the calling station's ID, being used as address information for this write operation.

The calling station ID is subsequently transmitted to the port each time the calling station transmits data to the port. This ID number is used as RAM address information and the destination port address and station ID are read out of the addressed RAM location and put into the leading bytes of a packet containing the data that is to be transmitted by the port over the data bus to the destination port and station.

The provisions of distributed addressing intelligence in the system ports is advantageous in that it eliminates the need for a central switch. This minimizes the possibility that the failure of a single element, i.e., the switch, can render the system inoperable. The use of a separate control bus between the port and the controller deloads the data bus by providing a separate path over which the controller can communicate with the ports. This improves reliability and simplifies maintenance by enabling the controller to communicate with a malfunctioning port that is monopolizing the data bus.

Each port is also equipped with facilities that permit the controller to send a maintenance command over the control bus to a malfunctioning port. The receipt of the command causes the port to be disconnected signalwise from both the arbitration bus and the data bus. This prevents the malfunctioning port from either requesting bus access via the arbitration bus or from applying signals to the data

BRIEF DESCRIPTION OF THE DRAWING

FIG. 6 discloses the data framing circuit.

DETAILED DESCRIPTION

Figure 1:
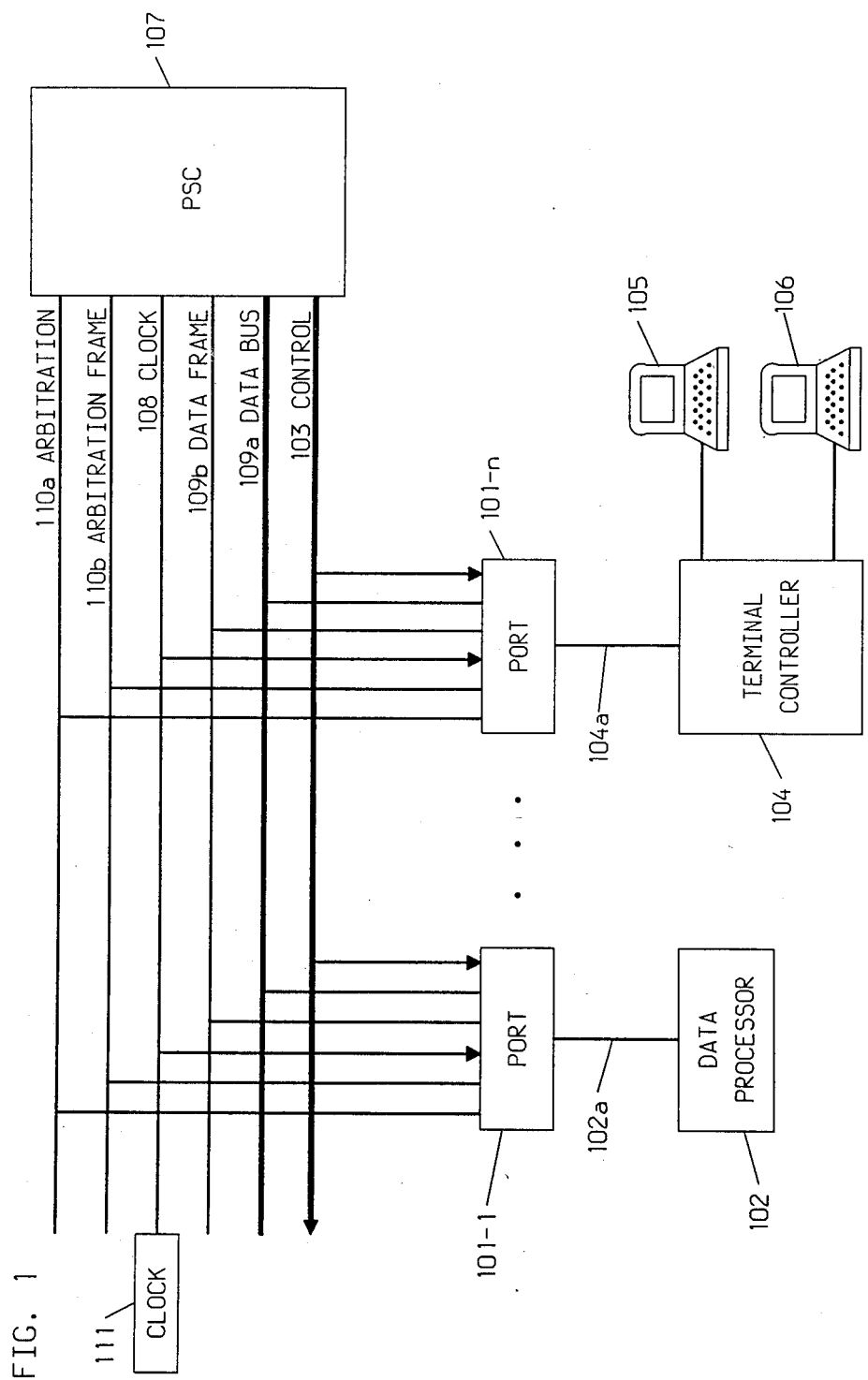
FIG. 1 discloses a packet switching system embodying the subject invention.

FIG. 1 discloses a packet switch system embodying one possible exemplary embodiment of the present invention. Shown on FIG. 1 are ports 101-1 through 101-n, data processor 102 and terminals 105 and 106. Also shown are terminal controller 104, packet switch controller (PSC) 107, clock 111, a bus and several other paths interconnecting these major components. The bus is data bus 109a and comprises enough lines to carry concurrently a parallel byte of data. Other paths include, control channel 103, arbitration line 110a, arbitration frame line 110b, data frame line 109b, and clock line 108.

The system of FIG. 1 is of the distributed type in that packets are addressed to a destination port and station by a transmitting port rather than by a central switch. A packet call is established when a user at a calling station, such as terminal 105 for example, goes off hook and dials the number of a called station, such as processor 102. The off hook indication and the dialed number are sent via terminal controller 104 to its dedicated port: 101-n. Port 101-n forms the off hook indication and the dialed number into a data packet and sends it over data bus 109a to PSC 107. PSC 107 responds by reading the addresses of the destination port and station from a memory internal to the PSC. This memory is programmed to cross-index dialed numbers with destination port and station addresses. PSC 107 then sends the addresses of the destination port 101-1 and station 102 over control channel 103 to port 101-n.

Calling port 101-n writes the received destination port and station addresses in a port RAM location dedicated to the sending station, terminal 105. In this way, the RAM in calling port 101-n is programmed so that when the RAM location dedicated to terminal 105 is subsequently addressed in response to receipt of data from terminal 105, the readout RAM location supplies the address of called port 101-1 and data processor 102. Subsequent data sent by a user at terminal 105 are formed into packets by terminal controller 104. Each packet contains the station ID of station 105 in the leading bytes. Port 101-n replaces the calling station ID with the destination port and station ID and puts the packet onto the data bus 109a.

ARBITRATION

After having received data and formed it into a packet, port 101-n must then contend with other ports 101 for the right to send its packet over bus 109a to a destination port and station. Arbitration is by distributed allocation in the present disclosure. According to this method, ports 101 contend for data bus access by applying port priority numbers, bit-by-bit, to arbitration line 110a. Contention begins when arbitration frame line 110b is high indicating that no ports 101 are currently contending. Contending ports draw arbitration frame line 110b low as they apply port priority numbers to arbitration line 110a. The largest bit applied is carried by arbitration line 110a. Each contending port (101) compares the bit it applies with the bit currently on line 110a and drops out of contention if the bit on the line is larger than the bit applied by the contending port. The contending port (101) with the highest priority number is the only one remaining at the end of the contention process. It wins data bus access. This type of contention is described in detail in U.S. Pat. No. 4,470,112 to J. O. Dimmick of Sept. 4, 1984.

ADDRESSING

A port 101 that wins arbitration monitors data frame line 109b to determine when data bus 109a is idle. A high on data frame line 109b indicates a free data bus 109a. A port that has won contention responds to this high by making arbitration frame line 110b high so a subsequent arbitration for the next data bus 109a access may begin. The winning port 101 then sends a destination port address over the data bus (109a) to alert the destination port 101 that data follows.

More specifically, consider the example transmission from terminal 105 to data processor 102. Recall that the address of data processor 102 and its port 101-1 is written during the process of establishing the call into a RAM location dedicated to terminal 105 in port 101-n. Following arbitration, a packet transmission is initiated when sending port 101-n receives data from terminal 105. Port 101-n applies the address of sending terminal 105 to its RAM and reads out the address of data processor 102 and port 101-1 from the RAM location dedicated to terminal 105. Port 101-n next applies sequentially the addresses of port 101-1 and data processor 102 to data bus 109a as the first two bytes of a packet. When it applies the first byte of the packet, port 101-n draws low the data frame line 109b to indicate the beginning of a packet transmission on data bus 109a.

All ports 101 constantly monitor data frame line 109b and bus 109a. The ports interpret the beginning of a low on data frame line 109b to mean that the current byte on data bus 109a is a port 101 address. The destination port address on data bus 109a in the present example is recognized by port 101-1 as being its address. The second byte of the address received by port 101-1 is that of data processor 102 and the reception of this byte alerts port 101-1 that data for station 102 follows.

DATA TRANSFER BETWEEN PORTS

After the destination port and station addresses have been sent in the first two bytes of a formed packet, sending port 101-n applies data in subsequent bytes to data bus 109a for transfer to receiving port 101-1 and, in turn, to addressed station 102. In the current example, sending port 101-n applies bytes of data received from terminal 105 to data bus 109a. The data are received by destination port 101-1 which transmits the address of processor 102 and the associated data bytes to processor 102. After the last byte of the packet is transmitted, port 101-n raises the potential of data frame line 109b to indicate that the data bus 109a is idle and available for use by another port. Data frame line 109b remains high until the next sending port 101 subsequently begins the transmission of another packet.

The framing signal on the data frame line 109b denotes the duration of a transmitted data packet by remaining in low state during transmission and in a high state when a data packet is not being transmitted. The duration of a packet depends upon the amount of data port 101-n has to transmit. Port 101-n holds low the signal on data frame line 109b during the entire duration of the packet transmission. This duration is the time required for the transmission of the destination port and station addresses and transmission of the data bytes from terminal 105. Port 101-n lets data frame line 109b go high at the end of the packet transmission. In this way, a currently transmitting port 101 signals all other ports when the data bus 109a is free for use by another port. In the prior art, the data framing signal, and hence the packet, was of fixed duration and was generated by a clock circuit that subdivided recurrent clock pulses so that a packet included exactly the prescribed number of bytes.

PORT 101

Figure 2:
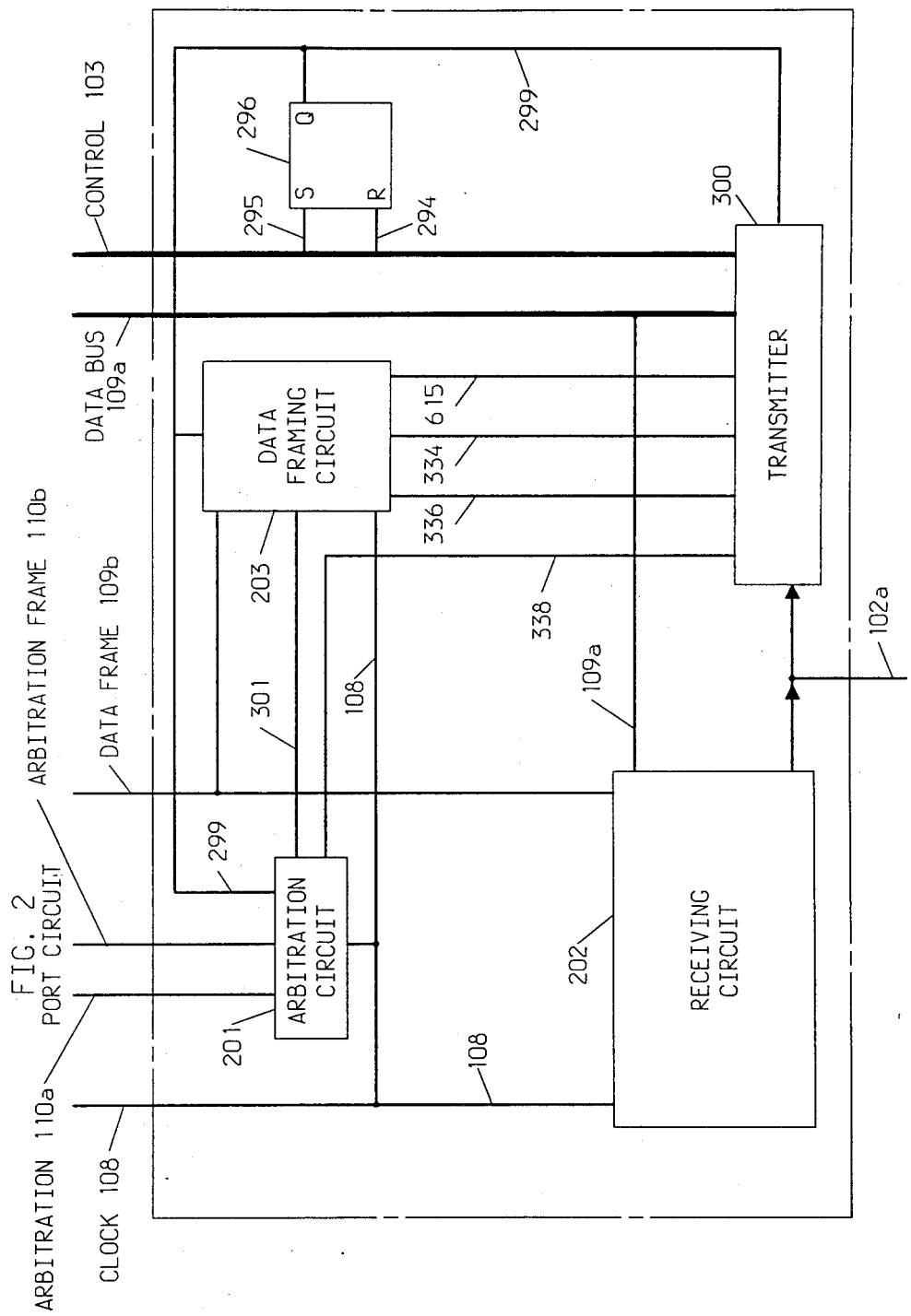
FIG. 2 discloses a port circuit.

FIG. 2 is a block diagram of a port 101. Shown are arbitration circuit 201, receiving cricuti 202, transmitter circuit 300, and data framing circuit 203 along with paths connecting these elements to each other and to the rest of the system.

The arbitration circuit 201 of a winning port sends a port selected signal over line 301 to data framing circuit 203 to enable the winning port to transmit data. Arbitration circuit 201 begins arbitration in response to a signal received on line 338 indicating that transmitter 300 has data to transmit. Arbitration takes place over arbitration line 110a. Timing signals indicating arbitration are sent by arbitration circuit 201 over arbitration frame line 110b.

The details of the arbitration and receiving circuits are well known. For example, after the framing signal goes low on line 109b receiving 202 of each port tests the first byte transmitted on data bus 109a to find if the byte is the address of its port. A port that detects its address in the first byte, unlocks its receiver and transfers the remaining bytes of the packet to the station specified by the second byte of the packet. The framing signal is made high on line 109b by the transmitting port at the end of the packet reception. This high signal indicates the end of the packet to the receiving port.

TRANSMITTER CIRCUIT

There are four steps to sending a packet of data regarding the transmitter circuitry of port 101-n. Step 1. During initialization of the system, PSC 107 programs port 101-n over control channel 103 with information termed action ID numbers. Each such number is two bytes long and each is assigned to one of the stations associated with port 101-n. Each number identifies port 101-n and the station to which the number is assigned. Each number is coded and used as the address portion of a packet that is subsequently directed to PSC 107. This packet is applied to data bus 109a by port 101-n at the beginning of each call. Thus each action ID number serves: to address PSC 107, to identify port 101-n, and to identify the number's associated station such as 105. Hereafter such a number is called an action ID.

Step 2. A call is established as follows. As station 105, in effect, goes off-hook and dials the number of a destination station to set up a call, the off-hook stimulus and dialed destination station number are sent by calling station 105 to terminal controller 104. Controller 104 responds and sends to port 101-n a two byte call-action command identifying station 105 followed by a call-setup command that includes the dialed station number. Port 101-n translates the call-action command into an action ID. This action ID along with the subsequent call setup command is formed into and applied as a packet to data bus 109a by port 101-n. PSC 107 receives the packet and programs port 101-n with information over control channel 103 so port 101-n can thereafter translate each subsequent reception of the station number of station 105 into the address of the destination port and station. PSC 107 also sends a packet to terminal controller 104 over data bus 109a to acknowledge receipt of the call-setup command.

Step 3. When station 105 sends data to terminal controller 104, terminal controller 104, in turn, sends the number of station 105 to port 101-n followed by the data controller 104 received from terminal 105. The calling station number 105 is translated into the destination port and station addresses by port 101-n. Destination port and station addresses are assembled into the first two bytes of a packet. The data to transmitted is inserted into the remaining bytes. The formed packet is applied by port 101-n to data bus 109a after the port wins arbitration.

Step 4. When station 105, in effect, goes on-hook at the end of its generation of data, an on-hook stimulus is sent by the station 105 to terminal controller 104. Controller 104 responds and sends to port 101-n a two byte call-action command followed by a call teardown command that includes the dialed station number. Port 101-n translates the call-action command into an action ID. This action ID along with the subsequent call teardown command is applied as a packet to data bus 109a by port 101-n. PSC 107 receives the packet and programs port 101-n over control channel 103 so port 101-n can no longer translate the station number of station 105 into the address of a destination station.

Figure 3:
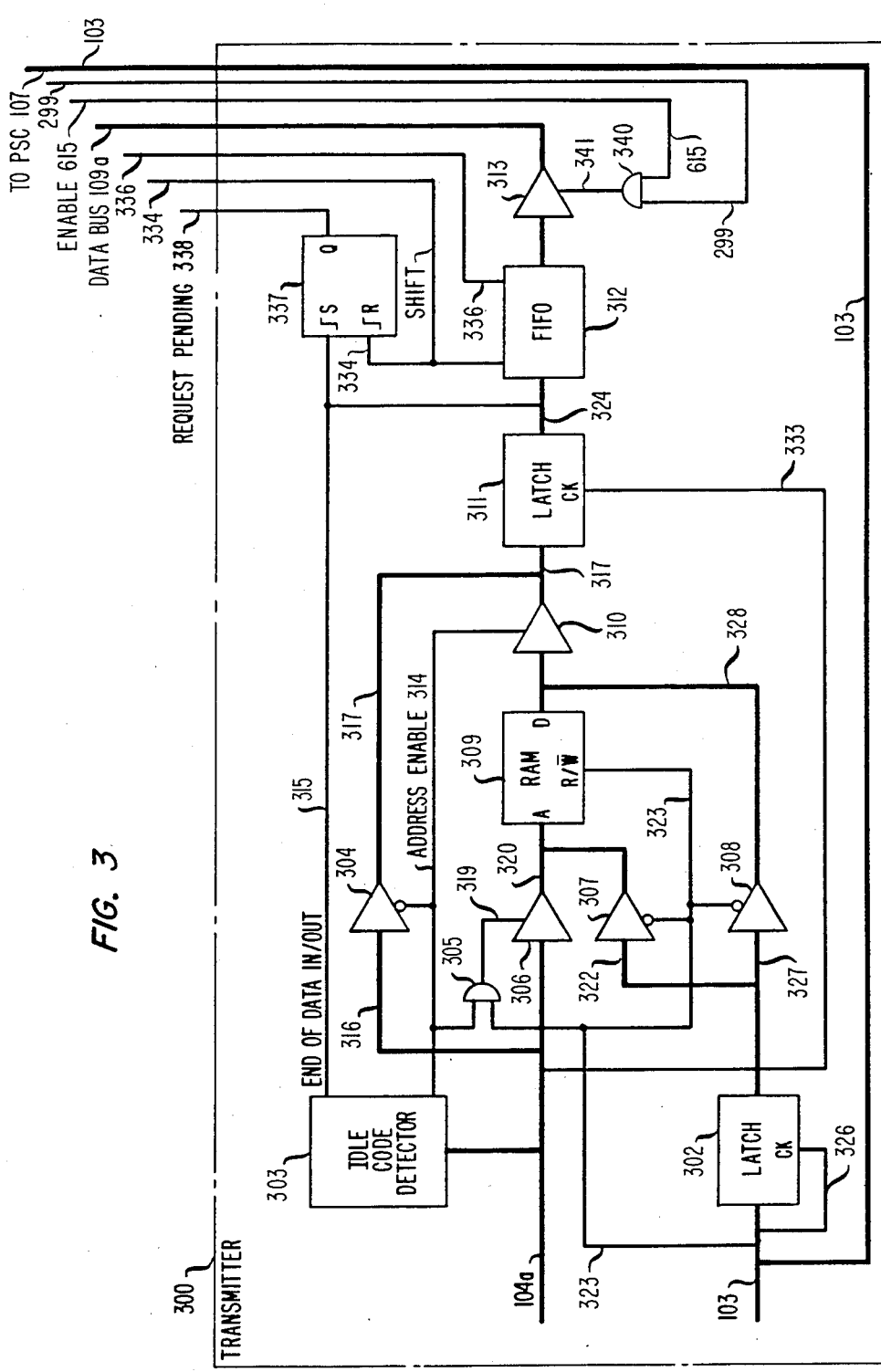
FIG. 3 discloses the data transmitter circuit.

FIG. 3 illustrates the circuitry of transmitter 300. A detailed description follows, but generally, the following are the functions of transmitter 300. Data from terminal controller 104 enter transmitter 300 over bus 104a. Transmitter 300 is programmed at the start of a packet call so a calling station address subsequently received from terminal controller 104 can be translated into destination port and station addresses. The calling station address received from terminal controller 104 on path 104a is translated into destination address information by RAM 309. Non address data from terminal 105 bypass the translation circuitry. Finally, transmitter 300 applies the translated destination address data the data from terminal 105 as a packet to data bus 109a.

Calling station address information received by the port enters RAM 309, is translated into destination addresses as subsequently described, is delayed in latch 311, and stored in FIFO 312 for later transmission. Data received from station 105 bypass RAM 309 via buffer 304, they are delayed in latch 311, and they are stored in FIFO 312 for later transmission over data bus 109a. Translation data received from PSC 107 at the set up of a call enter transmitter 300 on control channel 103 and write RAM 309 by means of elements 302 and 305 through 308.

In more detail, the transmitter circuit shown on FIG. 3 further comprises a write circuit for RAM 309 including latch 302 and tri-state buffers 307 and 308. The transmitter proper comprises idle code detector 303, AND gate 305, RAM 309, latch 311, FIFO 312, and tri-state buffers 304, 306, 310, and 313.

Before considering an example packet transmission, it should be understood how transmitter 300 detects the reception of a packet from terminal controller 104 over bus 104a. Transmitter 300 includes means for detecting the beginning and end of a packet being received over bus 104a from terminal controller 104. Idle codes consisting of bytes of null data are sent by terminal controller 104 over bus 104a when terminal controller 104 is not transmitting a packet on bus 104a. The end of these idle code bytes signifies the beginning of a packet transmission from terminal controller 104. The first idle code byte following the reception of data signifies the end of a packet transmission from terminal controller 104.

All received bytes are sensed by idle code detected 303 which produces one signal in response to the end of idle code bytes and a second signal in response to the beginning of idle code bytes. First, idle code detector 303 produces a high pulse on address enable line 314 during the reception of the first and second bytes of a packet received on bus 104a following the last byte of idle code. Second, idle code detector 303 produces a high pulse on line 315 during the first byte of idle code after a packet is received on bus 104a. The pulse on address enable line 314 is high while an address is present on path 104a. It marks the first two bytes of a data packet received from terminal controller 104. These two bytes comprise the address of the calling terminal that is sending data through terminal controller 104. The pulse on line 315 signals the end of a transmission over bus 104a from terminal controller 104.

An example call is set up as follows. Recall that terminal controller 104 initiates a call in response to an off-hook signal and the receipt of the dialed called station digits from calling station 105. Terminal controller 104 initiates the call by sending over bus 104a a two-byte call-action command identifying the calling station followed by a call-setup command that includes the dialed called station number and an off hook indication. At the beginning of the call-action command, idle code detector 303 senses the end of the idle code and applies a high signal to address enable line 314. This signal disables buffer 304, enables buffer 310 and, via AND gate 305, enables buffer 306.

The two bytes of the call-action command on path 104a enter RAM 309 on bus 320. The RAM translates the call-action command and applies an action ID number to bus 328. This action ID serves: to address PSC 107, to identify port 101-n, and to identify calling station 105. The signal on address enable line 314 goes low at the end the reception of the two-byte address on bus 104a. This low turns on buffer 304 and turns off buffers 310 and 306 so subsequently received bytes on path 104a bypass RAM 309 via buffer 304. Therefore, the action ID part of the incoming packet is applied to bus 317 via RAM 309 and buffers 306 and 310. The rest of the packet bytes, the call-setup command, arrives at bus 317 via buffer 304.

The last byte of each packet must be stored in FIFO 312 along with a bit indicating that it is the last byte. The source of this bit is idle code detector 303. However, the end-of-data bit on line 315 immediately follows the last byte of valid data received. Therefore the packet just described on bus 317 must be delayed so that the packet's final byte of data enters FIFO 312 at the same time as the "end of data" bit on line 315. The packet is delayed by latch 311 as follows.

A synchronizing clock pulse signalling the beginning of each byte is received over path 104a and enters transmitter circuit 300 on path 104a from terminal controller 104. This signal is separated from path 104a on line 333. The data applied to latch 311 is delayed slightly by the circuitry leading to latch 311. Since the pulse on line 333 is not delayed, it's leading edge arrives at latch 311 just before the beginning of the byte of which it was a part. Therefore the previous data byte is still present at the input to latch 311 when the leading edge of the pulse for the next data byte arrives on line 333. This previous byte is latched by latch 311 which is leading edge triggered on path 333. Thus, when a current byte enters transmitter 300 on bus 104a, the previous byte received is gated by of the sync signal for the current byte through latch 311 to bus 324. Thus, the data at the output of the latch 311 on bus 324 are effectively delayed by the width of one byte with respect to data entering transmitter 300.

The pulse on path 315 occurs when the first byte of null data appears on 104a following the last byte of good data. The purpose of the delay is achieved when the last byte of a packet is applied by latch 311 to the input of FIFO 312 at the same time the end-of-data-input pulse is applied over path 315 by idle code detector 303 to the input of FIFO 312. This end-of-data-input pulse is stored along with the last byte of good data of the packet in FIFO 312. This bit is used to indicate the last byte when FIFO 312 is read.

For the example call, a packet comprising the action ID and the call setup command is now in FIFO 312 along with a separate bit stored with the last byte of the packet. FIFO 312 applies these to data bus 109a.

At this point in the description, station 105 of FIG. 1 has sent an off-hook indication and dialed digits identifying the called station to terminal controller 104. In response, terminal controller 104 has sent a packet comprising a call-action command identifying station 105 and a call-setup command containing the dialed number to port 101-n over bus 104a. This packet, with the call-action command translated into the action ID, is now sent to PSC 107. The action ID contains the addresses of PSC 107 port 101-n and station 105.

PSC 107 sends an acknowledgement packet over data bus 109a to terminal controller 104 in response to receipt of the packet just described. PSC 107 also programs port 101-n over control channel 103 so port 101-n can translate its subsequent reception of the station port and station.

Assume transmitter 300 of FIG. 3 is an element of port 101-n thus programmed by PSC 107. RAM 309 of transmitter 300 is written to program port 101-n for the receiving of a call from station 105 to processor 102. Generally, the data necessary to program the port are applied to bus 103 by PSC 107, latched by latch 302, and written into RAM 309 via buffers 307 and 308.

This paragraph describes how the first and second halves of the number of calling station are applied sequentially to the address input of RAM 309 to write the destination port and station numbers into the addressed RAM locations. A control pulse is transmitted on control channel 103 by PSC 107 along with the RAM addresses and data-to-be-written. This pulse appears on line 326 which is separated from control channel 103 and connected to the clock input of latch 302. This pulse causes latch 302 to apply the first half of the calling terminal's station number from bus 103 to bus 322. At the same time, latch 302 applies the destination port address from bus 103 to bus 327.

While these numbers are applied to their busses, and after they are stable, PSC 107 applies a low read/write pulse over control channel 103 and line 323 and AND gate 305, tri-state buffers 306 through 308, and the read/write input of RAM 309. The low pulse on line 323 disables tri-state buffer 306 via AND gate 305. This opens the connection between bus 104a and the input of RAM 309 to avoid interference to the writing process from any possible signal on bus 104a. The low pulse on line 323 also enables tri-state buffers 307 and 308. This connects the address (A) and data (D) inputs of RAM 309, via busses 322 and 327 respectively, to their information source: the output of latch 302. Finally, for the instant that the pulse on line 323 is low, the pulse puts RAM 309 in write mode. This causes the destination port address to be written at the address in RAM 309 corresponding to the first half of the calling terminal's station number.

The next data to appear on control channel 103 from PSC 107 are the destination station address and the second half of the calling terminal's station number. In the same way just described, the destination station address is written into RAM 309 at the RAM address corresponding to the second half of the calling terminal's station number. Therefore, when the two halves of the source terminal's station number are subsequently applied in sequence by buffer 306 to bus 320 at the beginning of a data transmission, RAM 309 uses the received data as address information and applies the destination port and station numbers in sequence to bus 328.

Packet data are transmitted from a source station to a destination station as follows after RAM 309 has been programmed as just described. First a path is established from bus 104a, through buffers 306 and 310 so that the number of calling station 105 can be translated by RAM 309 into destination port and station addresses. The following describes how the path is established.

Recall that idle code from terminal controller 104 ends and station numbers begin on bus 104a coincident with the beginning of a high signal on line 314. Recall too, that tri-state buffers 306 and 310 are enabled and tri-state buffer 304 is disabled by the resulting high on line 314. Because of these actions, the station number of station 105 that appears in the first two sequential bytes of a transmission on bus 104a is applied to the address (A) input of RAM 309 via bus 320. Having been programmed as described earlier, RAM 309 sequentially applies destination port and station addresses to bus 317 in response to its receipt of the two halves of this station number.

After the destination addresses have been thus applied to bus 317, RAM 309 is bypassed so data bytes subsequently received on bus 104a pass to bus 317 unaltered by RAM 309. These data are conveyed from bus 104a to bus 317 via buffer 304. After RAM 309 has performed its translation, the signal changes on line 314 to low as already described in connection with the operation of idle code detector 303. This low signal disables tri-sate buffers 306 and 310 and enables tri-state buffer 304. Subsequent data bytes bypass RAM 309 via bus 316 and buffer 304 and appear unaltered at bus 317.

Figures 4, 5:
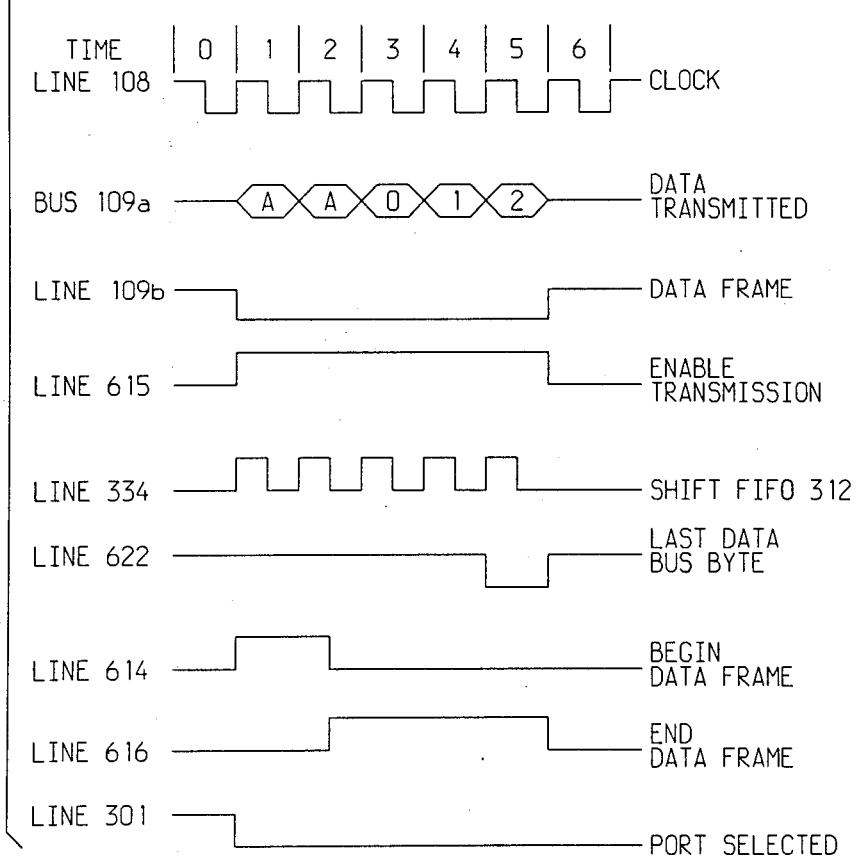
FIG. 4 discloses the contents of a transmitter circuit FIFO before the transmission of data.
FIG. 5 discloses the relationship among signals of various portions of the data framing circuit.

Bytes on bus 317 are delayed in latch 311. At the end of the transmission of data on bus 104a, a high bit is sent by idle code detector 303 via line 315 to FIFO 312 to indicate the last bit of the transmission. The packet, containing this data is loaded into FIFO 312 after being thus delayed with its last byte marked by the bit just mentioned. FIFO 312's contents at this point are indicated in FIG. 4.

FIFO 312 comprises a number of cascaded registers made up of data flip-flops loaded with data in the way described above. The contents of FIFO 312 when fully loaded are shown on the table in FIG. 4. The single bit in the left field of each byte indicates whether the byte is the last byte of a packet. The vertical line on the table separates the field of this bit from right field containing the bytes intended for transmission. The type of byte contained in a fully loaded register of FIFO 312 is indicated between the horizontal lines.

FIFO output register 400 contains an unknown byte indicated by X's. This is a remaining byte of data from the previous transmission. This byte is ingnored as the contents of register 401 are shifted out. FIFO register 401 contains the address of the port 101 that is the destination for the data to be transmitted. FIFO register 402 contains the address of the destination station. Subsequent FIFO registers 403-05 contain bytes of data to be transmitted via the destination port 101-1 to the destination station. Three bytes of data, bytes 0 through 2 are depicted in FIG. 4 for illustration purposes. There may be more or less data in FIFO 312 depending on the size of the packet to be transmitted. The method by which these data are applied to data bus 109a is subsequently described.

Flip-flop 337 is set by the high signal on line 315 when the last byte of a packet is applied to FIFO 312. Therefore, the signal on line 338 is high from the time FIFO 312 is loaded with a packet until the beginning of the process of shifting out data. This signal on line 338 is used to indicate that the transmitter has a full set of data. Line 338 is connected to arbitration circuit 201 and the high on line 338 provides the stimulus to activate the arbitration process for its port. Flip-flop 337 is reset by the first pulse on line 334. This is a pulse generated by the data framing circuit that shifts the first byte of data out of FIFO 312. A low-going signal on line 338 indicates the beginning of transmission over data bus 109a. the low signal is used to prevent further arbitration by port 101-n until FIFO 312 is again fully loaded.

Return to the example transmission, wherein FIFO 312 contains a full packet and line 338 is high. After arbitration and when the present port 101-n wins access to data bus 109a, data framing circuit 203 of FIG. 2 sends signals over lines 334 and 615 that cause FIFO 312 of FIG. 3 to shift out its data via buffer 313 and data bus 109a. Data framing circuit 203 sends a high signal over line 615, gate 340, and path 341 to enable buffer 313 and, while that signal is high, a series of pulses is sent over line 334 to shift data out of FIFO 312. The bit indicating the last byte of data to be transmitted is shifted out on line 336 as the last byte of the current set of data is transmitted over data bus 109a. This bit causes data framing circuit 203 of FIG. 2 to end the transmission by ending the pulse train on line 334 and by bringing low both signals on lines 334 and 615 to end the example transmission. At the same time, data framing circuit 300 raises the logic level on data frame line 109b.

Station 105 of FIG. 1 continues to send data to terminal controller 104. Terminal controller 104 continues to prepare packets consisting of the number of station 105 and the data generated by station 105. Terminal controller 104 sends each such packet to port 101-n. Port 101-n continues to translate the number of station 105 into the address of the destination port 101-1 and the destination station 102. For each packet received from terminal controller 104, port 101-n goes through the arbitration process already described. That is, port 101-n contends over arbitration line 110a while sending logic signals over arbitration frame line 110b to denote the stages of the contention process. Having determined that it has won contention for use of data bus 109a, port 101-n transmits the data from calling station 105 to destination station 102 by means of packets addressed to that station.

When the call is completed, station 105 sends the equivalent of an on-hook signal to terminal controller 104. In response, terminal controller 104 sends the call-action command to port 101-n as it did to set up the call. The call-action command is followed, however, by a call-teardown command in this case. The call-teardown command includes the dialed station number as did the call-setup command. Again, port 101-n translates the call-action command into the action ID. Port 101-n again makes up a packet of the action ID and the associated data: in this case, the call-teardown command. After winning arbitration, port 101-n sends this packet to PSC 107. In response to receipt of the action ID and call-teardown command, PSC 107 programs port 101-n via control channel 103 as it did to set up the call. To tear down the call, however, the number of station 105 is associated with an fictitious station address when port 101-n is again programmed.

DATA FRAMING CIRCUIT 203

FIG. 6 discloses the data framing circuit 203 which comprises gates 602, 604, 606, 609 and 612. It also comprises buffer 605 and data flip-flops 603 and 608. Also shown on FIG. 6 for clarity is the output circuitry of transmitter circuit 203 comprising FIFO 312 and tri-state buffer 313.

Data framing circuit 203 controls the transmission of packet data over data bus 109a by transmitter 300. Data framing circuit 203 also controls the signal on data frame line 109b while transmitter 300 sends data. Four signals provide system and port status information to data framing circuit 203 so it can frame the transmission of a packet. The purpose of these signals is generally described below. The action of all of these signals is subsequently described in detail.

First, a high port selected signal on line 301 indicates that the port's arbitration circuit 201 of FIG. 2 has been granted access to data bus 109a. Second, a high data frame signal on line 109b indicates that data bus 109a is idle and is therefore free to accept the present port's packet transmission. Third, a signal on line 336 is high during the transmission of the last byte of a packet. This high indicates to data framing circuit 203 that the final byte of a packet is being transmitted by the port's transmitter 300. And fourth, the system clock on line 108 provides a synchronizing signal.

The high port selected signal on line 301 and the high data frame signal on line 109b combine to indicate that conditions are corerct for the transmission of a packet to begin. The data framing circuit then enables packet transmission and uses the clock signal on line 108 to cause the transmitter 300 to transmit one byte of data per clock pulse over data bus 109a as subsequently described. The signal on line 335 from the transmitter is high during the last byte of a packet transmitted by transmitter 300. This signal causes data framing circuit 203 to signal the end of transmission by causing data frame line 109b to go high.

Arbitration circuit 201 provides a high enabling signal over line 301 to AND gate 602 when its port 101 is selected for access to data bus 109a. A high signal on data frame line 109b indicates an idle data bus 109a. The present port 101 must win the arbitration and the data bus must be idle before the present port 101 can transmit data. These conditions are fulfilled when AND gate 602 combines a high port selected signal on line 301 with a high signal on data frame line 109b to apply a high signal to line 613. This high signal on path 613 indicates that transmission from the present port 101 may begin. The next clock pulse on line 108 clocks the high on path 613 through data flip-flop 603 to line 614.

FIG. 5 illustrates the relationships between certain signals of FIG. 6 with respect to arbitrary units of time shown at the top of FIG. 5. Line and bus numbers are on the left of the illustrated waveforms. A brief indication of their functions are on the right. Hexagrams indicate the presence of data on bus 109a. An "A" within a hexagram indicates address data. A numeral within a hexagram indicates the byte number of data sent on bus 109a.

A high signal on line 614 is passed through OR gate 604 and inverter 605 at the junction of times 0 and 1 to draw the signal on data frame line 109b low. This low signal indicates the beginning of a transmission of a packet by a port that has won contention. The high signal on line 614 appears as a high at the input 615 to inverter 605. The high on enable line 615 is passed through gate 609 by the clock pulse on line 108 that begins with time 1. The resulting pulse on line 334 causes FIFO 312 of transmitter 300 to shift out the first byte of a packet to tri-state buffer 313. The high signal at enable line 615 enables buffer 313 of transmitter 300 so the byte just shifted out of FIFO 312 is applied by buffer 313 to data bus 109a. Thus, a high signal on enable line 615 both enables buffer 313 and enables the passage of clock pulses through gate 609 to line 334. The relationship, between the high gating signal on line 615 and the clocked gated signal on line 334 is shown on FIG. 5. Enabled gate 609 continues to transfer clock pulses from line 108 to FIFO 312 via line 334 as long as enable line 615 is high. Each pulse on line 334 causes FIFO 312 to shift out a byte of data.

Before time 1, the unknown byte 400 of FIG. 4 is present at the output of FIFO 312 and the input of buffer 313. The byte is not applied to data bus 109a because buffer 313 is disabled by the low on line 615 as illsutrated on FIG. 5 during time 0. At the junction of times 0 and 1, the rising edge of the shift pulse on line 334 causes FIFO 312 to shift one position and replace the unknown byte in register 400 with the port address byte of 401. Thus, by the time buffer 313 is enabled by the high signal on line 615, the port address byte is already present at the buffer 313 input and it is the first byte of the packet that is applied to data bus 109a. The first byte of the packet in FIFO 312 applied to data bus 109a, therefore, is the destination port 101-1 address.

As the high signal on line 615 keeps gate 609 enabled, each subsequent clock signal on line 108 passes through gate 609 and causes one byte of data to be shifted out of FIFO 312 and through buffer 313 to data bus 109a. Finally, the end of the packet is denoted as a high on line 336 as the "last byte" bit is shifted out by the FIFO. The high passes through NAND gate 612, is inverted, and is applied as a low to line 622. It is shown for time 5 of FIG. 5, that the last-byte bit is applied to line 622 with the last shift pulse on line 334. This is the time at which the last byte of data in the current packet is applied to data bus 109a.

Two actions end a transmission from the present port 101-1. Both actions result from the "last byte" signal on line 622. It is necessary to consider earlier signals affecting gate 604 to understand how the low signal on line 622 from NAND gate 612 raises the data frame signal of line 109b and disables the transmitter by applying a low signal to line 615.

The output of AND gate 602 goes low when data frame line 109b is drawn low by inverter 605 at the beginning of time 1. The next occurrence of a clock pulse on clock line 108, the beginning of time 2 of FIG. 5, clocks the low signal through data flip-flop 603. Line 614 applies this low to gate 604. However the high signal on line 615 and, therefore, the low on data frame line 109b is unaffected because line 616, the other input to OR gate 604, has meanwhile been made high as follows.

The input to gate 604 on line 616 is controlled by latch 608. During time 1, while the low signal on data frame line 109b is applied to AND gate 602, OR gate 604 applies a high to AND gate 606 via line 615. Line 622 is high at this time. As the pulse on clock line 108 clocks the low signal from gate 602 through data flip-flop 603 between times 1 and 2, it clocks the high signal on line 615 through data flip-flop 608 to line 616. The high on line 316 keeps data frame line 109b low by way of OR gate 604, line 615, and inverting buffer 605. These actions take place at the beginning of time 2 and the relationship between these signals is apparent from an inspection of that point in time on the waveforms of lines 614, 615, and 616.

This paragraph describes how data framing circuit raises the data frame signal on line 109b at the end of a packet. FIFO 312 applies a high signal via path 336 to NAND gate 612 as it sends its last byte of a packet over data bus 109a during time 5. The high signal passes through gate 612 because of the high enable signal on line 615. Gate 612 inverts the high signal and applies a low to gate 606 via line 622. This low signal on line 622 is shown during time 5 on FIG. 5. Gate 606 applies the low signal to the data input of flip-flop 608. This low signal is clocked through data flip-flop 608 by the next pulse on clock line 108. This next pulse on line 108 is coincident with the end of the last data byte applied to data bus 109a by FIFO 312 and buffer 313 at the juncture of time 5 and 6. This low signal on line 616 makes the signal on line 615 low by means of gate 604. The low on line 615 raises the data frame signal on line 109b by means of inverting buffer 605.

The rising edge of the signal on data frame line 109b marks the end of the current transmission over data bus 109a. The next port that has data to transmit and has won data bus artibration is enabled by the high signal on data frame line 109b.

Flip-flop 296 of FIG. 2 enables PSC 107 to take a malfunctioning port 101 out of service. The normal state of the circuit is for the flip-flop to be in a set state by a high from PSC 107 on path 295. The resultant high on path 299 extends to the arbitration circuit 201, data framing circuit 203 and transmitter 300. This high permits there circuits to perform then intended function.

A port circuit can become defective in that it can initiate false arbitration requests, applying meaningless arbitration signals to bus 110a or can apply meaningless data to bus 109a. PSC 107 can remove a malfunctioning port from service by applying a high to path 294 to reset flip-flop 296. This causes path 299 to go low. This low inhibits arbitration circuit 201 so that the port can no longer initiate an arbitration operation. This low on path 299 also extends to the transmitter where, on FIG. 3, the low disables AND gate 340. This prevents a high on path 615 from extending through gate 340 and over path 341 to enable buffer 313. Buffer 313 disabled prevents the port from applying data to bus 109a.

A high on path 299 extends to one input of gate 640 on FIG. 6. This primes the gate so a high on path 615 extends through the gate and over path 641 to enable inverting buffer 605. Under such conditions a high on path 615 is inverted to a low by the buffer and applied to data frame line 109b. A low on path 299 from reset flip-flop 296 disables gate 640 and prevents buffer 605 from being enabled by path 641. Under such conditions, a high on path 615 cannot cause buffer 605 to apply a low to data frame line 109b to make it busy.

What is claimed is:

1. In a packet switching system having a plurality of ports interconnected by a data bus:
   a system controller connected by a control bus and by said data bus to all of said ports,
   at least one station connected to each of said ports,
   means for applying call establishment information to a calling one of said ports from a connected calling station with said information including a called station number and a number identifying said calling station and a calling station off-hook indication signifying the initiation of a call,
   means in said calling port for transmitting information identifying said calling and called station to said controller, said controller being responsive to the receipt of said information for applying destination port and called station addresses over said control bus to said calling port,
   means in said calling port for subsequently receiving further information from said calling station with said further information including said calling station identification number as well as data to be transmitted over said data bus to said destination port and called station,
   means in said calling port responsive to the receipt of said further information for translating said received calling station identification number into said destination port and called station addresses,
   means in said calling port responsive to said translation for forming a packet comprising said data as well as said destination port and called station addresses, and
   means for applying said formed packet to said data bus for transmission to said destination port.

2. In a packet switching system having a plurality of ports interconnected by a data bus:
   a system controller connected by a control bus and by said data bus to all of said ports,
   at least one station connected to each of said ports,
   means in a calling one of said ports responsive to the initiation of a call at a connected calling station for receiving call establishment information from said calling station with said information including a called station number and a number identifying said calling station and a calling station off-hook indication signifying the initiation of a call,
   means in said calling port for transmitting said received call establishment information over said data bus to said controller, said controller being responsive to the receipt of said information for deriving destination port and called station addresses and for applying said destination port and called station addresses over said control bus to said calling port, means in said calling port for storing said derived addresses received from said controller, means in said calling port for subsequently receiving further information from said calling station with said further information including said calling station identification number as well as data to be transmitted over said data bus to said destination port and called station, means including said storing means in said calling port responsive to the receipt of said further information for translating said received calling station identification number into said destination port and called station addresses, means in said calling port responsive to said translation for forming a packet comprising said data to be transmitted as well as said destination port and called station addresses, and means for applying said formed packet to said data bus for transmission to said destination port.

3. The system of claim 2 wherein each of said ports further includes an arbitration circuit for requesting data bus access for the port of which said arbitration circuit is a part;

means in said calling port responsive to the forming of a packet for sending a signal to said arbitration circuit requesting data bus access, means for conveying a signal from said arbitration circuit to said calling port indicating that said port has been granted bus access, and means in said calling port responsive to the receipt of said signal for applying said formed packet to said bus.

4. The system of claim 2 wherein said means for storing comprises;

a memory, and means for writing said destination port and called station addresses received from said controller into said memory with said calling station identification number being used as memory address information for said write operation 5. The system of claim 4 wherein said means responsive to the receipt of said further information for translating comprises said memory and:

means responsive to the subsequent receipt of said calling station identification number for applying said number to said memory as address information, said memory being responsive to the receipt of said number for reading out said destination port and called station addresses, and means for applying said readout addresses to said means for forming a packet.

6. The system of claim 5 wherein said means for subsequently receiving information includes;

means for normally receiving null data bytes from a station in an idle condition, means responsive to the initiation of a call at said calling station for applying active data bytes including n bytes of data representing said identification number of said calling station port, and means responsive to the receipt of said calling station identification number by said calling port for applying said two of said n bytes sequentially to said memory as address information, said memory being responsive to said the reception of the first one of said two bytes for reading out said destination port address, said memory being responsive to the reception of the second one of said two bytes for reading out said called station address.

7. The system of claim 6 in combination with means for detecting the end of the reception of said active data bytes from said calling station:

means responsive to said detection for generating an end of packet signal, and means for inserting said end of packet signal in the last byte of said formed packet.

8. The system of claim 2 in combination with: means responsive to the initiation of a call at said calling station for sending a two byte call action command and a call setup command to said calling port, a memory, means for applying said received call action command to said memory, said memory being responsive to the receipt of said call action command for reading out information specifying the system address of said controller, the identification of said calling port and the idenfication of said calling station, means for forming a packet comprising said readout information and said call setup command and said called station number, and means for transmitting said formed packet over said data bus to said controller.

9. The system of claim 8 in combination with, said controller being responsive to the reception of said last named formed packet for deriving destination port and called station addresses from said called station number information, said controller being responsive to said derivation for applying to said calling port via said control bus said calling station identification together with said derived addresses, means in said calling port responsive to said receipt of said identification and said addresses from said controller for writing said destination port address in said memory with a first half of said calling station identification number being used as address information for said memory, and means in said port further responsive to said receipt for writing said destination called station address in said memory with a second half of said calling station identification number being used as address information for said memory.

10. A method of opeating a packet switching system having a plurality of ports interconnected by a data bus, said system further havin a controller connected by a control bus and by said data bus to all of said ports, each of said ports being connected to at least one associated station, said method comprising the steps of:

(1) applying call establishment information including a called station number and a calling station number and a calling station off-hook indication to a calling one of said ports from a calling station served by said calling port for intiating a call to a called station served by another one of said ports, (2) transmitting said call establishment information from said calling port over said data bus to said controller, (3) translating said transmitted information received by said controller into derived destination port and called station addresses.

(4) applying said derived destination port and called station addresses from said controller to said calling port over said control bus, (5) storing said derived addresses in said calling port, (6) subsequently applying from said calling station to said calling port said calling station number and data to be transmitted over said data bus, (7) translating said calling station number into destination port and called station addresses in response to the receipt of said calling station number by said calling port, (8) forming a packet comprising said destination port and called station addresses and said data, and (9) applying said formed packet from said calling port to said data bus for transmission to said destination port and called station.

* * * * *